R. B. COCHRANE.
METAL CUTTING MACHINE.
APPLICATION FILED SEPT. 18, 1915.
1,321,091.
Patented Nov. 11, 1919.
3 SHEETS—SHEET 3.
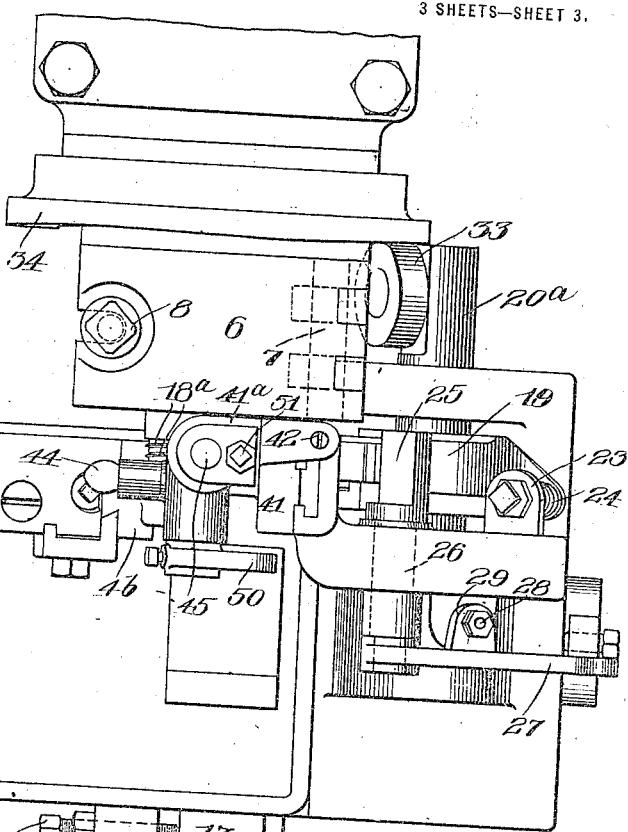
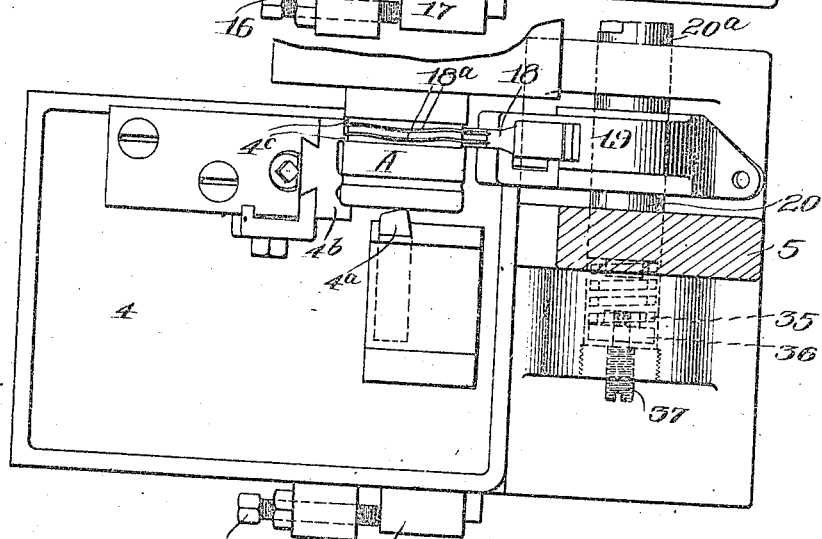
Robert B. Cochrane, INVENTOR.
BY
ATTORNEYS.

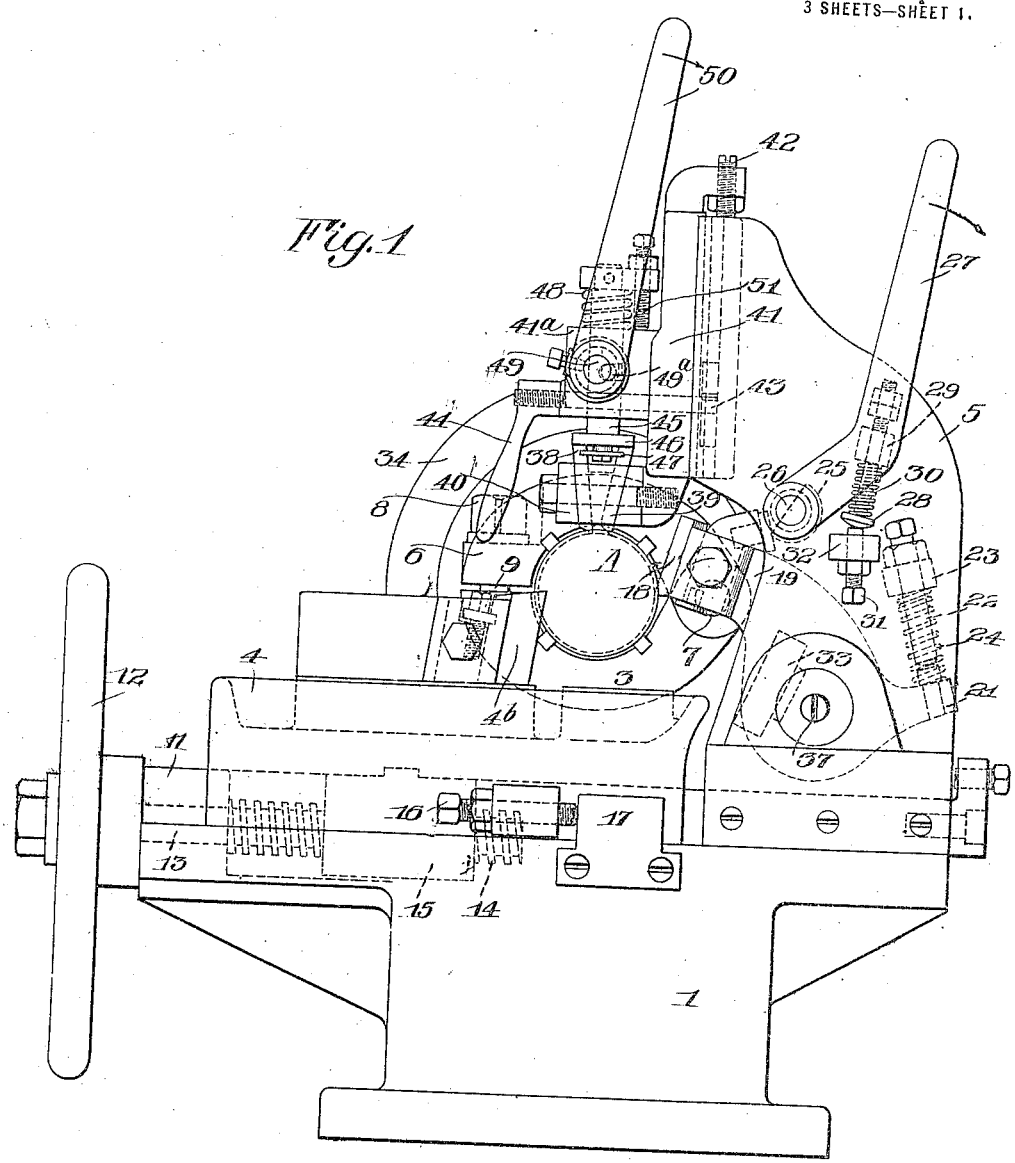

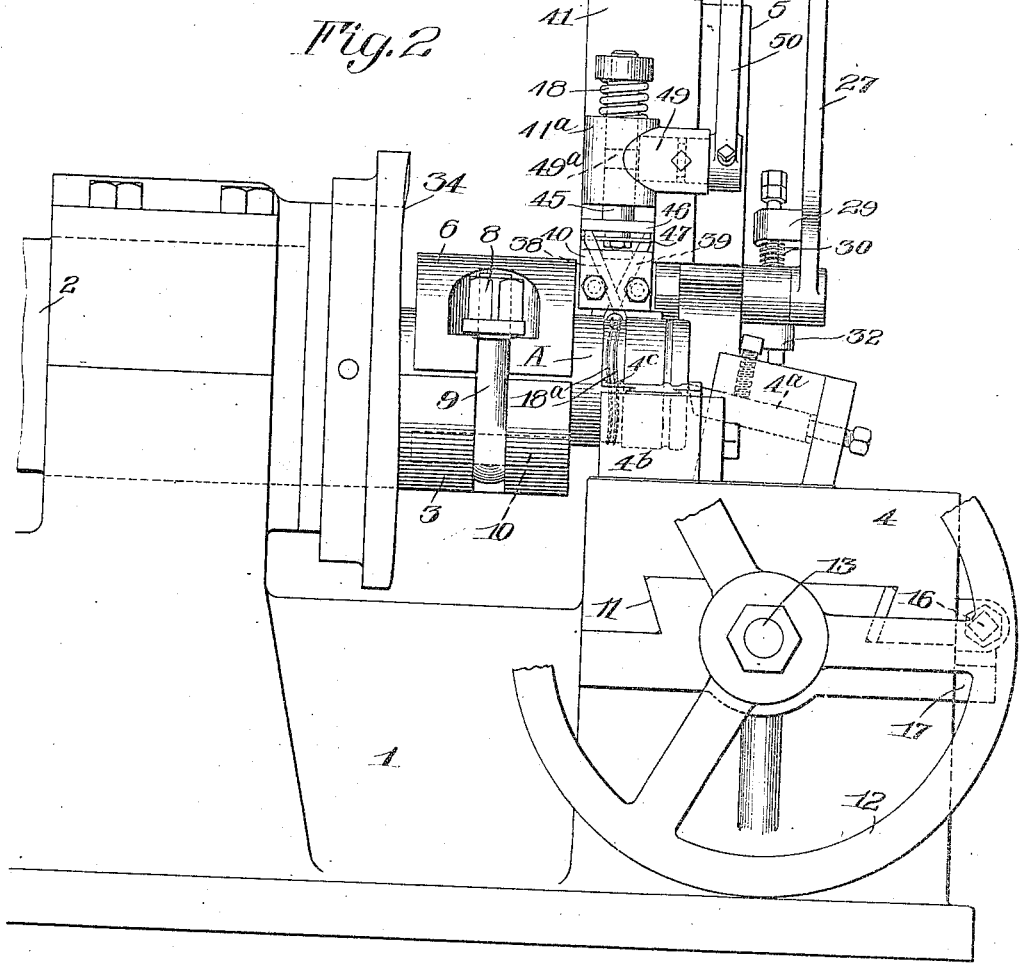

UNITED STATES PATENT OFFICE.

ROBERT B. COCHRANE, OF ROCHESTER, NEW YORK, ASSIGNOR TO T. H. SYMINGTON COMPANY, OF ROCHESTER, NEW YORK, A CORPORATION OF MAINE.

METAL-CUTTING MACHINE.

1,321,091.   Specification of Letters Patent.   Patented Nov. 11, 1919.

Application filed September 13, 1915. Serial No. 51,464.

*To all whom it may concern:*

Be it known that I, ROBERT B. COCHRANE, of Rochester, in the county of Monroe and State of New York, have invented certain new and useful Improvements in Metal-Cutting Machines; and I do hereby declare the following to be a full, clear, and exact description of the same, reference being had to the accompanying drawings, forming a part of this specification, and to the reference-numerals marked thereon.

The present invention relates to machines which are used particularly in the manufacture of that type of explosive shells or bombs known as shrapnel, and it has for its object to provide a metal cutting machine which is adapted especially for the purpose of cutting the annular groove or recess in the base of the shell-case, which is provided to receive the copper band or expansion ring and to provide in the bottom of the recess the waved ridges which assist in securing said band and prevent its rotation on the shell-case due to the frictional contact of the band with the rifling of the cannon during the longitudinal movement of the shell therein. To these and other ends the invention consists in certain improvements and combinations of parts, all of which will be hereinafter more fully described, the novel features being pointed out in the claims at the end of the specification.

In the drawings:

Figure 1 is a side elevational view showing one embodiment of my present invention;

Fig. 2 is a front elevation of the mechanism shown in Fig. 1;

Fig. 3 is a top plan view;

Fig. 4 is a horizontal sectional view taken through the supporting bracket for the undercutting tools looking in the direction of the base of the machine.

Fig. 5 is a detail view illustrating the operation of the under-cutting tools, and Fig. 6 is a detail view showing the operation of the groove cutter and wave rib cutter.

Similar reference numerals throughout the several views indicate the same parts.

The machine illustrated herein, it will be understood, is adapted to be used as one of a series of machines employed in the manufacture of shrapnel shell-cases, the latter being delivered in a state of partial completion. So far as the present machine is concerned, the prior operations consist in turning the shell-case to a specified diameter and length, and for these reasons the structure of the machine consists of few parts, which may be made of rigid construction, contributing not only to the accuracy of the work, but also to the speed with which the work pieces can be completed.

The grooving tool is mounted on a frame, preferably one having a short base 1 carrying the horizontal spindle 2, provided with a work piece holder or chuck 3, in front of which is arranged a slide or carriage 4 having limited transverse movement at the front of the frame and at the rear side thereof an upwardly extending bracket 5. In order to secure the required rigidity of the chuck, the latter is made with one of its jaws integral with the spindle 2 which comprises a shaft of large diameter, permitting said jaw to be cut or formed in a lip or projection thereon at one side of its axis, the other jaw of the chuck indicated by 6 is journaled on a bolt 7 as shown in dotted lines in Fig. 3, and is adjusted into open and closed position by the nut 8 on the rod 9 having an eye surrounding the pin 10 secured in the jaw 3. The aperture between the jaws 3 and 6 is bored to receive the work pieces indicated by A which are all of a given diameter, so that only a slight movement of the jaws is required to close them in engagement with the work piece, or to release the latter. The depth of the chuck is also fixed in order to determine the position of the outer end of the work piece or shell-case when the latter is inserted.

The cross slide 4 guided on horizontal ways 11 on the bed 1 is reciprocated by the hand wheel 12 on a shaft 13 which is provided with a thread 14 coöperating with the nut 15 on the bottom of the slide, and the inward movement of the latter is regulated by a screw stop 16 which coöperates with a projection 17 on the frame. The slide 4 carries a tool 4ª which is positioned to traverse the end of the work piece A at the forward side of its axis for the purpose of making the final or truing cut on this part of the shell-case and for insuring accuracy in the length of the shell-case, as determined by prior operations performed thereon.

Also mounted on the slide 4 is a cutter 4ᵇ which may have one or more projections thereon for grooving the end of the shell, but its primary object is to cut the annular groove in which the copper expansion ring is to be seated, and it is operated preliminarily to the under-cutting of the edges of the groove and the formation of the wave ridges at the bottom thereof, and to this end the tool 4ᵇ is provided with the spaced cutting points 4ᶜ, which determine the width of said groove and the position of the latter relatively to the base or butt of the shell-case. The depth of the groove or grooves is determined by the adjustment of the stop 16 on the carriage 4.

The other tools, the functions of which have been briefly mentioned above are mounted upon the bracket 5 and are actuated manually by the operator. The rib cutter indicated by 18, is carried upon an arm 19 which curves rearwardly and downwardly, and is rigidly secured to the shaft 20 which is journaled in the bracket 5. At the rear side of the arm is a projecting finger 21 which coöperates with a threaded bolt 22 supported on a lug 23 which may be adjusted to limit the rocking movement of the arm 19 in one direction to determine the depth of the cut to be made by the tool 18. Surrounding the adjustable stop 22 is an expansible coil spring 24 which serves to normally hold the tool 18 in a retracted or inoperative position out of engagement with the work piece, and in contact with its actuating cam 25 formed on the shaft 26 journaled on the bracket 5, and oscillated by the lever arm or handle 27, which is rotated forwardly from the position shown in Fig. 1 upon the completion of the operation of the tool 18. The lever 27 carries a yielding stop in the form of a pin 28 which slides in the lug 29 on the handle against the tension of a coil spring 30 and coöperates with a set screw 31 adjustable in the lug 32 on the bracket 5. The tool 18 being in its normal position, pressure on the lever 27 to move it rearwardly must be sufficient in the first instance to overcome the resistance of the spring 24 and the stop 31 is adjusted so that when the edge of the tool engages the work piece the operator will feel the increased resistance in the movement of the lever due to the action of the spring 30, which enables him through the sense of feeling to regulate the bite of the tool 18 at the commencement of its cutting operation.

The cutting edge of the tool 18 is formed as shown in Fig. 6 for the purpose of providing at the bottom of the band groove, two or more ribs 18ᵃ, and in order that these may be warped or waved, the tool is reciprocated. This operation is accomplished by extending the end of the shaft 20 as indicated by 20ᵃ in Fig. 3 and providing it with a projection in the form of a roller 33 which bears against the face of the cam ring 34 carried on the spindle 2, the roller being caused to bear against the face of the cam by means of a spring 35 positioned between the end of the shaft 20 and a bearing block 36 which may be adjusted by the screw 37.

The edges of the band groove are under-cut or dovetailed and two tools 38 and 39 are employed for this purpose and are arranged to be operated simultaneously. These tools are inclined relatively to each other in opposite directions and are guided on a head or block 40 in such a position that one tool is in advance of the other, as shown particularly in Figs. 1 and 5. The guide block 40 and devices for operating the tools therein are supported upon a slide 41 mounted in guides extending vertically in the upper end of the bracket 5 for the purpose of permitting these parts to be elevated to give free access to the work piece and facilitate the application of the calipers and gages thereto. The position of the guide block or head 40 is determined by the adjustable set screw 42 and the slide is clamped rigidly on the bracket by the bolt 43 carrying the hand nut 44.

Vertical movement of the under-cutting tools 38 and 39 is accomplished by reciprocation of the stud 45 which carries at its lower end a collar 46 resting against the upper ends of said tools and serving to force them into engagement with the work piece and a plate 47 fitting notches in the adjacent edges of the tools for the purpose of retracting them. The stud 45 is guided for vertical movement in a bracket 41ᵃ on the slide 41 and is normally retracted by a spring 48. Journaled on the side of the bracket 41ᵃ is a short shaft 49 having an eccentric pin 49ᵃ at one end which enters an aperture in the stud 45 and provided at its opposite extremity with an operating arm or handle 50, the swinging of which in the direction of the arrow in Fig. 1, is sufficient to move the stud 45 downwardly against the tension of the spring 48 until its movement is arrested by a set screw 51 forming a stop which coöperates with the bracket 41ᵃ, which, it will be understood is adjusted to regulate the depth of the cut formed by the tools 38 and 39.

I claim as my invention:

1. A metal cutting machine comprising in combination a frame, a rotatable member mounted thereon adapted to support a work piece, a cam faced member carried by the rotatable member, a shaft slidably mounted upon the frame, a roller carried by the shaft, means for yieldingly holding the shaft in position to cause the roller to engage the cam face member, and a tool holding member pivotally connected with the shaft and provided with a tool movable into cutting engagement with the work piece adapted to be reciprocated upon the work by the action of the cam face member upon said roller.

2. A metal cutting machine comprising in combination a frame, a rotatable member mounted thereon adapted to support a work piece, a cam faced member rigidly connected with the rotatable member, a shaft slidably mounted upon the frame, a roller carried by the shaft, means for yieldingly holding the shaft in position to cause the roller to engage the cam faced member, a tool supporting member mounted upon the shaft provided with a cutting tool, means for normally positioning said tool supporting member to hold said tool out of engagement with the work piece, and a lever provided with an actuating cam adapted when operated to engage the tool supporting member for the purpose of forcing said tool into engagement with the work piece.

3. A metal cutting machine comprising in combination a frame, a rotatable member mounted thereon adapted to support a work piece, a bracket carried by the frame, a guideway formed therein, a slide adjustably mounted in the guideway, a tool holding head carried by the slide adapted to receive oppositely inclined tools positioned at an angle to the face of the work piece, a bracket carried by the slide, a stud slidably mounted on the bracket, a collar carried by the stud to engage the tops of said tools for the purpose of forcing the same into engagement with the work piece, means carried by the stud in engagement with the tools for supporting the same, a spring carried by the stud in engagement with the last mentioned bracket for normally causing the stud to hold said tools out of engagement with the work piece, and a lever operatively connected with the stud for causing said collar to force the oppositely inclined tools into the edges of a groove formed in the work piece for the purpose of under-cutting the same.

4. A metal cutting machine comprising in combination a frame, a rotatable member mounted thereon adapted to support a work piece, a bracket carried by the frame, a guideway formed therein, a slide adjustably mounted in the guideway, a tool holding head carried by the slide adapted to receive oppositely inclined tools positioned at an angle to the face of the work piece, a bracket carried by the slide, a stud slidably mounted in the bracket, means carried by the stud adapted to support said tools, a spring mounted on the last mentioned bracket in engagement with the stud for normally supporting the same in position to hold the tools out of engagement with the work piece, and means for operating the stud to cause the same to force said tools into engagement with the edges of a groove formed in the work piece.

ROBERT B. COCHRANE.

Witnesses:
HENRY W. HALL,
FRANCIS JERDONE, Jr.